United States Patent
Bontu et al.

(10) Patent No.: US 10,506,479 B2
(45) Date of Patent: Dec. 10, 2019

(54) HANDOVER FOR NON-STANDARD USER EQUIPMENT WITH SPECIAL CAPABILITIES

(71) Applicant: TELEFONAKTIEBOLAGET LM ERICSSON (PUBL), Stockholm (SE)

(72) Inventors: Chandra Bontu, Nepean (CA); Prabaharan Kanesalingam, Ottawa (CA); Patrick Lie Chin Cheong, Kanata (CA); Bing Hu Z, Kanata (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/736,785

(22) PCT Filed: Jun. 13, 2016

(86) PCT No.: PCT/SE2016/050565
§ 371 (c)(1),
(2) Date: Dec. 15, 2017

(87) PCT Pub. No.: WO2016/204676
PCT Pub. Date: Dec. 22, 2016

(65) Prior Publication Data
US 2018/0192335 A1    Jul. 5, 2018

Related U.S. Application Data

(60) Provisional application No. 62/175,602, filed on Jun. 15, 2015, provisional application No. 62/201,250, filed on Aug. 5, 2015.

(51) Int. Cl.
*H04W 4/00* (2018.01)
*H04W 36/00* (2009.01)
(Continued)

(52) U.S. Cl.
CPC ... *H04W 36/0061* (2013.01); *H04W 36/0072* (2013.01); *H04W 36/24* (2013.01);
(Continued)

(58) Field of Classification Search
USPC ......... 455/450, 436, 439, 442; 370/329, 217
See application file for complete search history.

(56) References Cited

U.S. PATENT DOCUMENTS 5,365,520 A * 11/1994 Wang ............... H04B 7/185
370/217
9,648,445 B2 * 5/2017 Jang ............... H04W 48/18
(Continued)

FOREIGN PATENT DOCUMENTS

WO    2007066882 A1    6/2007
WO    2015026286 A1    2/2015

OTHER PUBLICATIONS

3rd Generation Partnership Project; Technical Specification Group Radio Access Network; Evolved Universal Terrestrial Radio Access Network (E-UTRAN); X2 application protocol (X2AP) (Release 12), 3GPP TS 36.423 V12.5.0 (Mar. 2015).
(Continued)

Primary Examiner — David Q Nguyen

(57) ABSTRACT

A network node obtains capability information indicating whether neighbor network nodes support special user equipments (UEs), receives a measurement report for the neighbor network nodes from a special UE, and selects one of the network nodes as a target node for handover of the special UE based on the received measurement report and the obtained capability information.

8 Claims, 12 Drawing Sheets

(51) Int. Cl.
  *H04W 36/24*  (2009.01)
  *H04W 74/08*  (2009.01)
  *H04W 8/24*   (2009.01)
(52) U.S. Cl.
  CPC .......... *H04W 74/0833* (2013.01); *H04W 8/24* (2013.01); *H04W 36/0088* (2013.01)

(56) References Cited

U.S. PATENT DOCUMENTS

| | | | |
|---|---|---|---|
| 2010/0216479 A1* | 8/2010 | Kato | H04W 74/002 455/450 |
| 2014/0018085 A1* | 1/2014 | Young | H04W 52/0235 455/450 |
| 2014/0135006 A1 | 5/2014 | Yu et al. | |
| 2015/0098449 A1 | 4/2015 | Lee et al. | |
| 2015/0271746 A1* | 9/2015 | Jang | H04W 48/18 370/329 |
| 2016/0323916 A1* | 11/2016 | Lee | H04W 76/10 |
| 2017/0019930 A1* | 1/2017 | Lee | H04W 74/0833 |
| 2018/0103419 A1* | 4/2018 | Lee | H04W 48/12 |

OTHER PUBLICATIONS

3rd Generation Partnership Project; Technical Specification Group Radio Access Network; Evolved Universal Terrestrial Radio Access (E-UTRA); User Equipment (UE) radio access capabilities (Release 12), 3GPP TS 36.306 V12.3.0 (Dec. 2014).

3rd Generation Partnership Project; Technical Specification Group Radio Access Network; Evolved Universal Terrestrial Radio Access (E-UTRA); Physical channels and modulation (Release 12), 3GPP TS 36.211 V12.4.0 (Dec. 2014), Section 5.7.2.

3rd Generation Partnership Project; Technical Specification Group Radio Access Network; Study on provision of low-cost Machine-Type Communications (MTC) User Equipments (UEs) based on LTE (Release 12), 3GPP TR 36.888 V12.0.0 (Jun. 2013).

3rd Generation Partnership Project; Technical Specification Group Radio Access Network; Evolved Universal Terrestrial Radio Access (E-UTRA); Radio Resource Control (RRC); Protocol specification (Release 12), 3GPP TS 36.331 V12.4.1 (Dec. 2014).

3rd Generation Partnership Project; Technical Specification Group Radio Access Network; Evolved Universal Terrestrial Radio Access (E-UTRA); Medium Access Control (MAC) protocol specification (Release 12), 3GPP TS 36.321 V12.4.0 (Dec. 2014), Sections 5.1, 6.2.1.

Internation Search Report dated Oct. 21, 2016, for International Application No. PCT/SE2016/050565, International Filing Date: Jun. 13, 2016, consisting of 7 pages.

Written Opinion dated Oct. 21, 2016, for International Application No. PCT/SE2016/050565, International Filing Date: Jun. 13, 2016, consisting of 11 pages.

* cited by examiner

| Index | LCID values |
|---|---|
| 00000 | CCCH |
| 00001-01010 | Identity of the logical channel |
| 01011-11001 | Reserved |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

FIG. 3

HANDOVER FOR NON-STANDARD USER EQUIPMENT WITH SPECIAL CAPABILITIES

CROSS-REFERENCE TO RELATED APPLICATION

This application claims priority to U.S. Provisional Application No. 62/175,602 filed on Jun. 15, 2015, the disclosure of which is hereby incorporated by reference in its entirety.

TECHNICAL FIELD

The disclosed subject matter relates generally to telecommunications and more particularly to network communications systems, network nodes, and user equipment (UE) performing handover.

BACKGROUND

There are currently numerous radio/wireless and cellular access technologies and standards such as Global System for Mobile Communications/General Packet Radio Service (GSM/GPRS), Wideband Code Division Multiple Access/ High Speed Packet Access (WCDMA/HSPA), CDMA-based technologies, wireless fidelity (WiFi), Worldwide Interoperability for Microwave Access (WiMAX) and Long Term Evolution (LTE), to name but a few. These and other technologies and standards have been developed during the last few decades, and it can be expected that the development will continue, for example within 5G. Specifications are developed in organizations such as $3^{rd}$ Generation Partnership Project (3GPP), 3GPP2 and the Institute of Electrical and Electronics Engineers (IEEE).

One important aspect of cellular systems is mobility and handover (HO). Typically, handover in cellular systems is network controlled, where the network is assisted by measurements provided by a UE. Various measurement events (or triggers) can be configured by the network, such that the UE reports e.g., when radio conditions change in a particular way. Consequently, it should be possible for the network to make sound decisions on whether a handover of a UE is needed. For example, for a mobile terminal/UE to inform the network about new strong cells that can be used as a potential new serving cell, different measurement events are defined both in LTE and WCDMA/HSPA.

Intra E-UTRAN Handover is used to handover a UE from a serving eNodeB (source eNodeB) to a target eNodeB using X2 when the MME is unchanged.

Handover procedures are well established procedures and are outlined for example in 3GPP specifications.

There are, however, instances where UEs or other network nodes have capabilities or limitations that are not fully standard compliant and therefore established HO procedures are not applicable.

SUMMARY

In some embodiments, a method of operating a network node comprises obtaining capability information indicating whether neighbor network nodes support special UEs, receiving a measurement report for the neighbor network nodes from a special UE, and selecting one of the network nodes as a target node for handover of the special UE based on the received measurement report and the obtained capability information.

In certain related embodiments, the method further comprises sending a handover request message to the selected target node, the handover request message requesting handover for the special UE as an incoming UE and indicating that the incoming UE is a special UE.

In certain related embodiments, the method further comprises receiving a handover request acknowledgement message from the target node, the handover request acknowledgement message comprising mobility control information that includes a special multicast message.

In certain related embodiments, the special multicast message indicates that the target node supports special UEs.

In certain related embodiments, the handover request acknowledgement message comprises a set of random access channel (RACH) preambles as part of the mobility control information.

In certain related embodiments, the handover request acknowledgement message comprises a set of physical resources for transmission of RACH preamble as part of the mobility control information.

In certain related embodiments, the handover request acknowledgement message comprises a set of physical resources for transmission of RACH preamble as part of the mobility control information.

In certain related embodiments, the method further comprises sending mobility control information received from the target node towards the special UE.

In some embodiments, a method of operating a network node comprises sending capability information to neighbor network nodes, the capability information indicating whether neighbor network nodes support special UEs, receiving a handover request message requesting handover of an incoming UE to the network node as a target node, the handover request message indicating that the incoming UE is a special UE, and sending a handover request acknowledgement message from the target node, the handover request acknowledgement message comprising mobility control information that includes a special multicast message.

In certain related embodiments, the special multicast message indicates the support information from a network node for special UE.

In certain related embodiments, the handover request acknowledgement message comprises a set of RACH preambles as part of the mobility control information.

In certain related embodiments, the handover request acknowledgement message comprises a set of physical resources for transmission of RACH preamble as part of the mobility control information.

In certain related embodiments, the handover request acknowledgement message includes a set of physical resources for transmission of RACH preamble as part of the mobility control information.

In certain related embodiments, the handover request acknowledgement message from the target node includes a set of RACH preambles as part of the mobility control information.

In certain related embodiments, the method further comprises receiving an LCID from the special UE as part of message 3.

In certain related embodiments, the method further comprises receiving one from the set of RACH preambles included in the mobility control information from the UE.

In certain related embodiments, the method further comprises receiving a RACH preamble in one of the set of RACH preamble physical resources included in the mobility control information from the UE.

In certain related embodiments, the method further comprises receiving a RACH preamble from the set of RACH preambles included in the mobility control information in one of the set of RACH preamble physical resources included in the mobility control information from the UE.

In some embodiments, a method is provided for a handover procedure by a communication system comprising a UE, a serving network node and at least two additional network nodes, wherein the at least two network nodes shared information about their respective capabilities with their respective at least one neighbor network node. The method comprises, at the serving network node receiving a measurement report from the UE, wherein the measurement report comprises information about non-standard complaint capabilities of the UE, and at the serving network node determining based on the measurement report a target network node among the at least two additional network nodes.

In certain related embodiments, the method further comprises the target network node broadcasting the target network node's non-standard compliant capabilities to the at least one UE.

In certain related embodiments, the broadcasting comprises transmitting a SiMulticastSpecialUeSupport message.

In certain related embodiments, the method further comprises after RACH preamble transmission, the UE sending to the target network node a Radio Resource Control (RRC) connection reconfiguration complete as part of Random Access Msg 3, wherein the Msg 3 comprises a Logical Channel Identity (LCID) indicating that the UE comprises non-standard complaint capabilities.

In certain related embodiments, the method further comprises the serving network node sending, as part of the hand-over request, to the target network node information identifying the UE as a UE comprising non-standard complaint capabilities.

In certain related embodiments, the method further comprises the target network node sending, as part of the hand-over request acknowledgement, a SiMulticastSpecialUeSupport message, to the serving network node, wherein the SiMulticastSpecialUeSupport message comprise information about the target network nodes capabilities to support UE comprising non-standard complaint capabilities, and the serving network node sending an RRC connection reconfiguration message to the UE, the RRC connection reconfiguration message comprising the SiMulticastSpecialUeSupport message information.

In certain related embodiments, the method further comprises, after RACH preamble transmission, the UE sending to the target network node a Radio Resource Control (RRC) connection reconfiguration complete as part of Random Access Msg 3, wherein the Msg 3 comprises a Logical Channel Identity, LCID, indicating that the UE comprise non-standard complaint capabilities.

In certain related embodiments, the method further comprises the serving network node sending, as part of the hand-over request, to the target network node information identifying the UE as a UE comprising non-standard complaint capabilities.

In certain related embodiments, the method further comprises the target network node sending, as part of the hand-over request acknowledgement, a unique set of RACH preambles and/or radio resource configuration for sending RACH preambles and a SiMulticastSpecialUeSupport message, to the serving network node, and the serving network node sending a unique set of RACH preambles and/or radio resource configuration for sending RACH preambles to the UE.

In certain related embodiments, the method further comprises the UE performing the RACH procedure, wherein the RACH procedure comprises randomly selecting one RACH preamble and/or radio resource configuration for sending the RACH preamble.

In certain related embodiments, the method further comprises, after RACH preamble transmission, the UE sending to the target network node, a Radio Resource Control (RRC) connection reconfiguration complete as part of Random Access Msg 3, wherein the Msg 3 comprises a Logical Channel Identity (LCID) indicating that the UE comprise non-standard complaint capabilities.

In some embodiments, a method of operating a wireless communication device comprises transmitting a measurement report to a serving network node, the measurement report comprising information about non-standard complaint capabilities of the wireless communication device, receiving from the serving network node a message indicating capabilities of a target network node to support a wireless communication device having the non-standard complaint capabilities, wherein the message is obtained by the serving node from the target network node, and after RACH preamble transmission, transmitting to the target network node an RRC connection reconfiguration complete as part of Random Access Msg 3, wherein the Msg 3 comprises a Logical Channel Identity (LCID) indicating that the wireless communication device has the non-standard complaint capabilities.

In certain related embodiments, the method further comprises receiving information broadcasted from the target network node and indicating non-standard compliant capabilities of the target network node.

In certain related embodiments, the broadcasted information comprises a SiMulticastSpecialUeSupport message.

In certain related embodiments, the method further comprises receiving a set of RACH preambles and/or radio resource configuration from the serving network node, and performing a RACH procedure, comprising randomly selecting a RACH preamble and/or radio resource configuration from among the received set, wherein the set is received by the serving network node from the target network node as part of a handover request acknowledgement.

In some embodiments, a network node comprises at least one processor configured to obtain capability information indicating whether neighbor network nodes support special UEs, receive a measurement report for the neighbor network nodes from a special UE, and select one of the network nodes as a target node for handover of the special UE based on the received measurement report and the obtained capability information.

In certain related embodiments, the at least one processor is further configured to send a handover request message to the selected target node, the handover request message requesting handover for the special UE as an incoming UE and indicating that the incoming UE is a special UE.

In certain related embodiments, the at least one processor is further configured to receive a handover request acknowledgement message from the target node, the handover request acknowledgement message comprising mobility control information that includes a special multicast message.

In certain related embodiments, the special multicast message indicates that the target node supports special UEs.

In some embodiments, a network node comprises at least one processor configured to send capability information to neighbor network nodes, the capability information indicating whether neighbor network nodes support special UEs receive a handover request message requesting handover of an incoming UE to the network node as a target node, the handover request message indicating that the incoming UE is a special UE, and send a handover request acknowledgement message from the target node, the handover request acknowledgement message comprising mobility control information that includes a special multicast message.

In certain related embodiments, the special multicast message indicates the support information from a network node for special UE.

In certain related embodiments, the handover request acknowledgement message comprises a set of RACH preambles as part of the mobility control information.

In certain related embodiments, the handover request acknowledgement message comprises a set of physical resources for transmission of RACH preamble as part of the mobility control information.

In some embodiments, a wireless communication device comprises at least one processor, a transmitter configured to transmit a measurement report to a serving network node, the measurement report comprising information about non-standard complaint capabilities of the wireless communication device, and a receiver configured to receive from the serving network node a message indicating capabilities of a target network node to support a wireless communication device having the non-standard complaint capabilities, wherein the message is obtained by the serving node from the target network node. The transmitter is further configured to, after RACH preamble transmission, transmit to the target network node an RRC connection reconfiguration complete as part of Random Access Msg 3, wherein the Msg 3 comprises a Logical Channel Identity (LCID) indicating that the wireless communication device has the non-standard complaint capabilities.

In certain related embodiments, the receiver is further configured to receive information broadcasted from the target network node and indicating non-standard compliant capabilities of the target network node.

In certain related embodiments, the broadcasted information comprises a SiMulticastSpecialUeSupport message.

In certain related embodiments, the receiver is further configured to receive a set of RACH preambles and/or radio resource configuration from the serving network node, and the at least on processor is configured to perform a RACH procedure comprising randomly selecting a RACH preamble and/or radio resource configuration from among the received set, wherein the set is received by the serving network node from the target network node as part of a handover request acknowledgement.

In some embodiments, a network node comprises an obtaining module configured to obtain capability information indicating whether neighbor network nodes support special UEs, a receiving module configured to receive a measurement report for the neighbor network nodes from a special UE, and a selecting module configured to select one of the network nodes as a target node for handover of the special UE based on the received measurement report and the obtained capability information.

In certain related embodiments, the network node further comprises a sending module configured to send a handover request message to the selected target node, the handover request message requesting handover for the special UE as an incoming UE and indicating that the incoming UE is a special UE.

In certain related embodiments, the network node further comprises a second receiving module configured to receive a handover request acknowledgement message from the target node, the handover request acknowledgement message comprising mobility control information that includes a special multicast message.

In certain related embodiments, the special multicast message indicates that the target node supports special UEs.

In some embodiments, a network node comprises a sending module configured to send capability information to neighbor network nodes, the capability information indicating whether neighbor network nodes support special UEs, a receiving module configured to receive a handover request message requesting handover of an incoming UE to the network node as a target node, the handover request message indicating that the incoming UE is a special UE, and a second sending module configured to send a handover request acknowledgement message from the target node, the handover request acknowledgement message comprising mobility control information that includes a special multicast message.

In certain related embodiments, the special multicast message indicates the support information from a network node for special UE.

In certain related embodiments, the handover request acknowledgement message comprises a set of RACH preambles as part of the mobility control information.

In certain related embodiments the handover request acknowledgement message comprises a set of physical resources for transmission of RACH preamble as part of the mobility control information.

In some embodiments, a wireless communication device comprises a transmission module configured to transmit a measurement report to a serving network node, the measurement report comprising information about non-standard complaint capabilities of the wireless communication device, and a receiving module configured to receive from the serving network node a message indicating capabilities of a target network node to support a wireless communication device having the non-standard complaint capabilities, wherein the message is obtained by the serving node from the target network node. The transmission module is further configured to, after RACH preamble transmission, transmit to the target network node an RRC connection reconfiguration complete as part of Random Access Msg 3, wherein the Msg 3 comprises a Logical Channel Identity (LCID) indicating that the wireless communication device has the non-standard complaint capabilities.

In certain related embodiments, the receiving module is further configured to receive information broadcasted from the target network node and indicating non-standard compliant capabilities of the target network node.

In certain related embodiments, the broadcasted information comprises a SiMulticastSpecialUeSupport message.

BRIEF DESCRIPTION OF THE DRAWINGS

The drawings illustrate selected embodiments of the disclosed subject matter. In the drawings, like reference labels denote like features.

FIG. 3 shows a table of LCID values according to an embodiment of the disclosed subject matter.

DETAILED DESCRIPTION

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Certain embodiments relate to UEs or network nodes having built-in additional capabilities and/or limitations relative to standardized UEs or network nodes. Such UEs may be referred to as e.g., "special UEs", "partially standard-compliant UEs", "partially standard-defined UEs" or "non-standard UEs". The built-in additional capabilities and/or limitations may be referred to as "special capabilities" or "non-standard complaint capabilities". Network support capabilities for such special UEs may be referred to as "special UE-support capabilities". Network nodes providing support for special UEs may be referred to as "special network nodes" or "partially standard-defined network nodes".

Certain embodiments are presented in recognition of shortcomings with conventional approaches, such as the following. Handover of a special UE that may e.g. provide proprietary services typically involves one or more of the following: (1) a cell with the capability of serving the special UE should inform neighbor cells about the special capabilities of the special UE; (2) the serving cell should inform the UE about the serving cell's special UE-support capabilities; and (3) UE should check autonomously whether the target cell can support the special UE and establish an RRC connection accordingly.

In some standards, X2 and S1 based HO messages between network nodes have a transparent container that can facilitate proprietary information exchange. However, this is not enough to support the HO of a special UE.

The described embodiments may be implemented in any appropriate type of communication system supporting any suitable communication standards and using any suitable components. As one example, certain embodiments may be implemented in an LTE network, such as that illustrated in FIG. 1.

Figure 1:
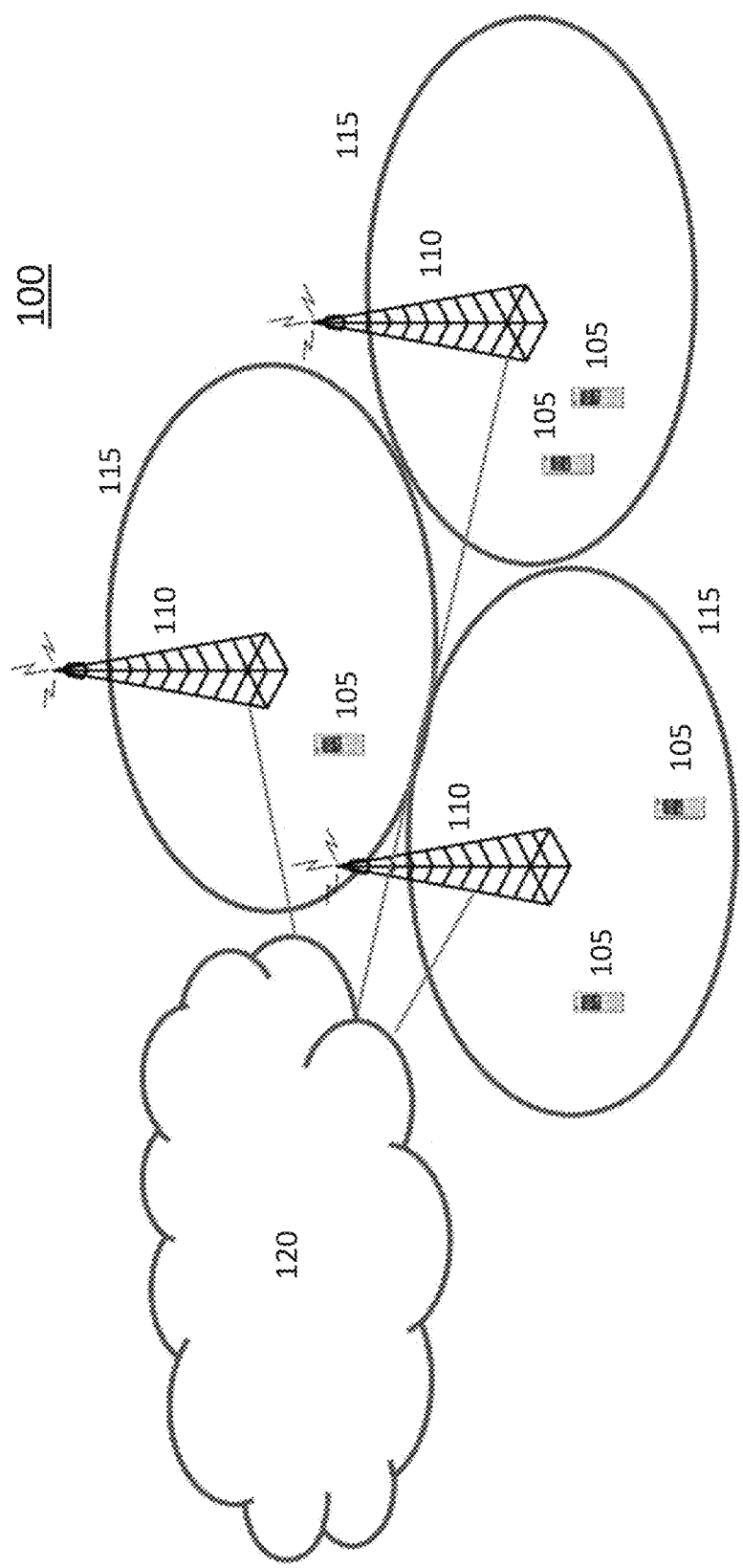
FIG. 1 is diagram illustrating a wireless communications network according to an embodiment of the disclosed subject matter.

FIG. 1 illustrates a communication network 100 according to an embodiment of the disclosed subject matter.

Referring to FIG. 1, a communication network 100 comprises a plurality of wireless communication devices 105 (e.g., UEs, machine type communication [MTC]/machine-to-machine [M2M] UEs, cellular radiotelephone—e.g., a smartphone, a feature phone; network adaptor or card, a modem or other such interface device, a tablet or laptop computer, or other device with wireless communication capabilities) and a plurality of radio access nodes 110 (e.g., eNodeBs or other base stations). Communication network 100 is organized into cells 115, which are connected to a core network 120 via corresponding radio access nodes 110. Radio access nodes 110 are capable of communicating with wireless communication devices 105 along with any additional features suitable to support communication between wireless communication devices or between a wireless communication device and another communication device (such as a landline telephone).

Figure 2A:
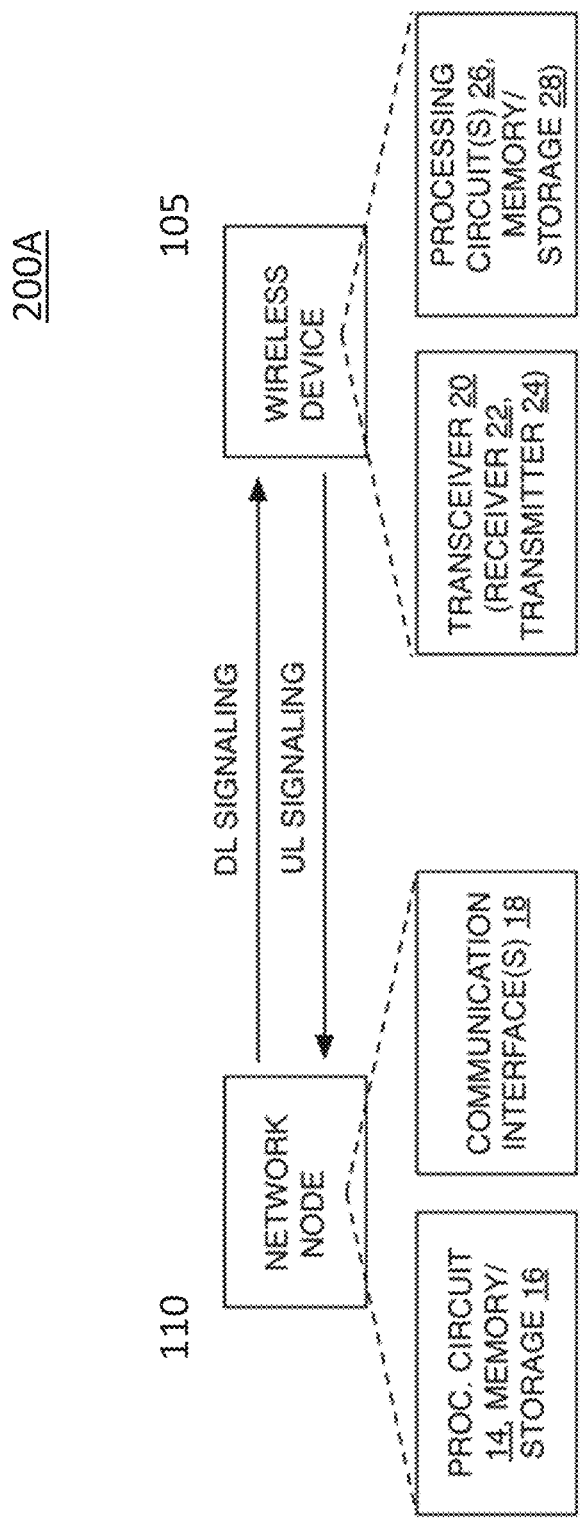
FIG. 2A is diagram illustrating a wireless communications network according to another embodiment of the disclosed subject matter.
Figure 2B:
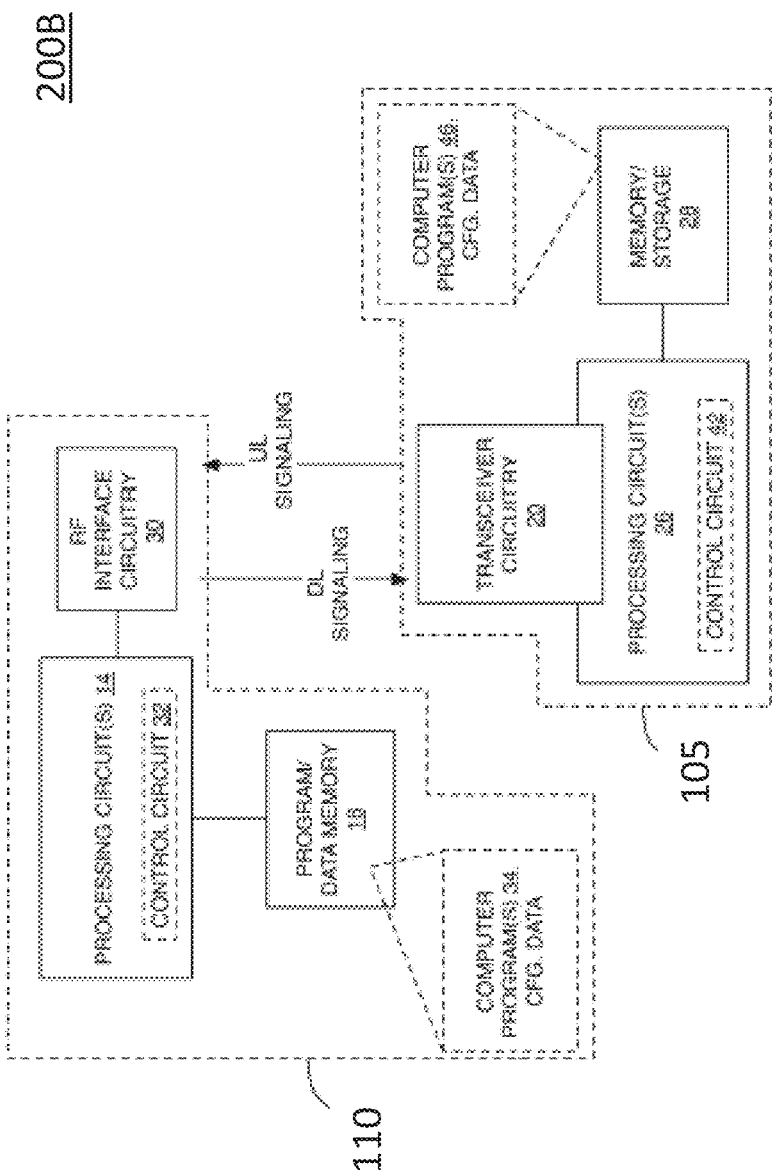
FIG. 2B is diagram illustrating a wireless communications network according to another embodiment of the disclosed subject matter.

Although wireless communication devices 105 may represent communication devices that include any suitable combination of hardware and/or software, these wireless communication devices may, in certain embodiments, represent devices such as those illustrated in greater detail by FIG. 2A or 2B. Similarly, although the illustrated radio access node may represent network nodes that include any suitable combination of hardware and/or software, these nodes may, in particular embodiments, represent devices such as the example radio access node illustrated in greater detail by FIG. 2A or 2B.

FIG. 2A illustrates a communication network 200A according to an embodiment of the disclosed subject matter. Communication network 200A represents one of many possible implementations of communication network 100.

Referring to FIG. 2A, communication network 200A comprises wireless communication device 105 and radio access node 110. In this embodiment, wireless communication device 105 comprises a transceiver 20 comprising a receiver 22 and a transmitter 24, a processing circuit 26, and memory/storage 28. Radio access node 110 comprises a processing circuit 14, memory/storage 16, and one or more communication interfaces 18. The illustrated features may represent functional and/or physical circuit arrangements, which may take the form of, e.g., digital processing circuits and associated memory or other computer-readable medium for storing configuration data, operational or working data, and for storing computer program instructions. In some embodiments, network-side and device-side functionality is realized at least in part through the programmatic configuration of digital processing circuitry, based on the execution by that circuitry of stored computer program instructions.

Memory/storage 16 and 28 may comprise, e.g., one or more types of computer-readable medium, such as volatile, working memory and non-volatile configuration and program memory or storage. Communication interface 18 may be implemented according to the nature of radio access node 110. In a base station or other radio node example, communication interface 18 includes a radio transceiver, e.g., pools of radio transmission, reception, and processing circuitry, for communicating with any number of wireless communication devices 105 in any one or more cells of a wireless communication network. In such examples, communication interface 18 comprises one or more transmitters and receivers, e.g., cellular radio circuits, along with power control circuitry and associated signal-processing circuitry. Further, in the same scenario, the communication interface 18 may include inter-base-station interfaces and/or backhaul or other Core Network, CN, communication interfaces.

FIG. 2B illustrates a communication network 200B according to an embodiment of the disclosed subject matter. Communication network 200B is a more detailed example of communication network 200A, in which processing circuit 14 comprises a control circuit 32, memory/storage 16 stores a computer program 34 and/or configuration data, communication interface 18 comprises RF interface circuitry 30, processing circuit 26 comprises a control circuit 42, and memory/storage 28 stores a computer program 46 and/or configuration data.

In certain embodiments, a handover method comprises the following:
- a serving cell selecting a target cell based on a measurement report from a special UE and the target cell's capabilities of supporting a special UE;
- the serving cell sending a HO request message to the target cell;
- the serving cell receiving a HO request acknowledgement from the target cell;
- the special UE obtaining information about the target cell's capability to support the special services; and
- the special UE identifying its special status to the target cell.

As explained in further detail below, in some embodiments a target cell is selected based on the target cell's capability to continue the UE's special services uninterrupted. In some embodiments, cells supporting special UEs may multicast such capability periodically. A UE may further check the network support by reading the multicast message advertised by the network nodes. The UE may be further required to confirm its special status by sending a unique code to the network node during the RRC connection setup.

In some embodiments, serving and target cells exchange information about their possibility to support UE capabilities and network capabilities during the HO preparation phase.

In communication networks such as those based on Long Term Evolution (LTE) as specified by the Third Generation Partnership Project (3GGP), there are certain data layer functions designed for mass communication with a large number of wireless devices, commonly referred to as "user equipments" (UEs). Some data layer functions are designed for peer-to-peer control of transport channels and for mapping between transport channels and logical channels. Examples of such functions include those used by the Radio Resource Control (RRC) protocol.

According to the Evolved Packet System (EPS) defined by the 3GPP LTE architecture, the radio access network is referred to as an Evolved Universal Terrestrial Radio Access Network (E-UTRAN). The E-UTRAN includes base stations, referred to as eNodeBs (eNBs) that provide E-UTRA user-plane and control-plane protocol terminations towards the UEs. User-plane protocol examples include Packet Data Convergence Protocol (PDCP), Radio Link Control (RLC), Medium Access Control (MAC), and Physical Layer (PHY), while control-plane protocol examples include RRC.

The eNBs are connected by an "S1" interface to a core network, which is referred to as an Evolved Packet Core (EPC). More specifically, the eNBs have S1 connections to a Mobility Management Entity (MME), through an S1-MME interface and to a Serving Gateway (S-GW), through an S1-U interface. Upon request from an MME, an eNB performs an E-RAB to radio bearer mapping and establishes a Data Radio Bearer and allocates the required resources on the air interface, referred to as the "Uu" interface. The eNB also sets up a logical channel for the UE and allocates it to a transport channel. These operations involve the MAC layer.

3GPP specifies the E-UTRAN MAC protocol as a sublayer of layer 2. Functions of the MAC sublayer are performed by MAC entities in the UE and in the E-UTRAN. For a MAC entity configured at the eNB, there is a peer MAC entity configured at the UE and vice versa.

A mapping of logical channels to transport channels at the MAC sublayer is configured by RRC signaling. There is one Logical Channel Identifier (LCID) field for each MAC service data unit (SDU) included in the corresponding MAC protocol data unit (PDU). The LCID field size is 5 bits, where the value 00000 is reserved for CCCH and the value 11111 is reserved for padding. The LCID for the Downlink Shared Channel (DL-SCH) uses the range 11000-11110 for MAC Control Elements (MAC CEs). A MAC CE is an explicit MAC in-band control message. The range 01011-10111 is reserved for future needs within the framework of the controlling standard. Similarly, the LCID for the Uplink (UL) Shared Channel (UL-SCH) uses the range 10110-11110 for explicit MAC in-band control, while the range 01100-10101 is reserved for future needs within the standard.

Further, the LCID values that are predefined for use in identifying logical channels in the MAC sublayer is 00001-01010. From within this range, the LCID values of 00001 and 00002 are reserved for the signaling radio bearers used by RRC. Consequently, there are eight LCID values available for mapping logical channels to data radio bearers.

These and other details can be seen in the below tables, excerpted from 3GPP TS 36.321, V12.4.0 (2015-01). For example, FIG. 3 depicts "Table 6.2.1-1 Values of LCID for DL-SCH".

Figure 4:
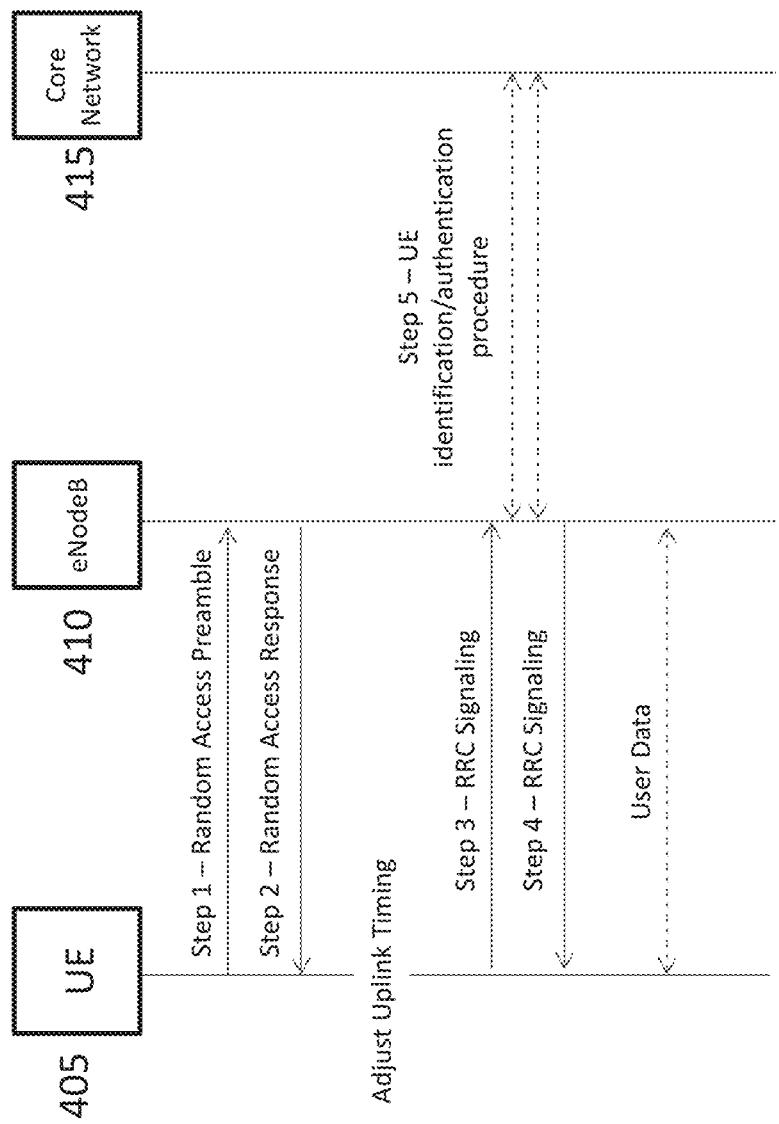
FIG. 4 is a signaling diagram of a random access procedure according to an embodiment of the disclosed subject matter.

Certain embodiments may be implemented in the context of a random access process such as that illustrated in FIG. 4. As illustrated in FIG. 4, the random access process comprises Steps 1-4 in which a UE 405 establishes a connection with an eNB 410. In the case of initial random access (i.e., where the UE is not already identified to the eNB), additional UE identification/authentication procedure is required at the eNB 410 with help of core network 415. Notably, the random access process of FIG. 4 is a contention-based random access process. In a contention-free random access process, Steps 5 may be omitted and Steps 1-4 may be modified. Various additional aspects described and illustrated in relation to FIG. 4 may be modified, omitted, or expanded upon, as will be apparent to those skilled in the art. For example, the order of certain operations may be changed, or certain operations may be performed by signaling that differs from that described or illustrated in relation to FIG. 4.

In Step 1, UE 405 transmits a random access preamble to eNB 410. Among other things, the transmission of the random-access preamble allows eNB 410 to estimate the transmission timing of UE 405 for uplink synchronization, and it also allows eNB 410 to determine the classification of UE 410.

In Step 2, eNB 410 transmits a random access response to UE 405. The response typically includes a timing advance command to adjust the transmission timing of UE 405, based on the timing estimate obtained in Step 1. In addition, Step 2 also assigns uplink resources to UE 405 to be used in Step 3. The assignment of uplink resources may be determined, at least in part, by the classification of UE 405.

In Step 3, UE 405 transmits a mobile-terminal identity to eNB 410 using UL-SCH similar to normal scheduled data. The content of the signaling generally depends on the state of the UE 405, such as whether it is already known to the network. Additionally, UE 405 transmits an LCID value to eNB 410. Then, in Step 4, eNB 410 transmits a contention resolution message to UE 405 on DL-SCH. After the UE is connected to the eNB there is a large flexibility for the eNB to realize the transport of data between the UE and the network, as illustrated by a dotted two-way arrow in FIG. 4.

Signaling using the RRC protocol between the UE and the eNB is performed during RRC Connection establishment that is initiated in Random Access Msg 3.

In an example handover procedure the serving eNB (source eNB) configures the UE measurement procedures according to the area restriction information. The UE sends a measurement report according to rules set by e.g. system information, specification, etc. The serving eNB makes decision based on measurement report and RRM information to hand off UE and issues a HANDOVER REQUEST message to the target eNB passing necessary information to prepare the HO at the target side.

Admission Control may be performed by the target eNB dependent on the received E-RAB Quality of Service (QoS) information to increase the likelihood of a successful HO. The target eNB configures the required resources according to the received E-RAB QoS information. Target eNB prepares HO with L1/L2 and sends the HANDOVER REQUEST ACKNOWLEDGE to the serving eNB. The HANDOVER REQUEST ACKNOWLEDGE message includes a transparent container to be sent to the UE as an RRC message to perform the handover.

The UE receives the RRCConnectionReconfiguration message with necessary parameters (i.e. new C-RNTI, target eNB security algorithm identifiers, and optionally dedicated RACH preamble, target eNB SIBs, etc.) and is commanded by the serving eNB to perform the HO. The source eNB sends the SN STATUS TRANSFER message to the target eNB to convey the uplink PDCP SN receiver status and the downlink PDCP SN transmitter status of E-RABs for which PDCP status preservation applies (i.e. for RLC AM).

After receiving the RRCConnectionReconfiguration message including the mobilityControlInformation, the UE performs synchronization to target eNB and accesses the target cell via RACH. The target eNB responds with UL allocation and timing advance. The UE sends the RRCConnectionReconfigurationComplete message (C-RNTI) to confirm the handover to the target eNB to indicate that the handover procedure is completed for the UE. The target eNB verifies the C-RNTI sent in the RRCConnectionReconfigurationComplete message. The target eNB can now begin sending data to the UE.

The target eNB sends a PATH SWITCH message to MME to inform that the UE has changed cell. The MME sends an UPDATE USER PLANE REQUEST message to the Serving Gateway. The Serving Gateway switches the downlink data path to the target side. The Serving gateway sends one or more "end marker" packets on the old path to the source eNB and then can release any U-plane/TNL resources towards the source eNB. The serving Gateway sends an UPDATE USER PLANE RESPONSE message to MME. The MME confirms the PATH SWITCH message with the PATH SWITCH ACKNOWLEDGE message. By sending UE CONTEXT RELEASE, the target eNB informs success of HO to source eNB and triggers the release of resources by the source eNB. The target eNB sends this message after the PATH SWITCH ACKNOWLEDGE message is received from the MME. Upon reception of the UE CONTEXT RELEASE message, the source eNB can release radio and C-plane related resources associated to the UE context. Any ongoing data forwarding may continue.

The process of handing-over (X2 or S1) a connected standard-compliant UE from a serving cell to another cell in E-UTRA typically comprises the following: (1) receiving a measurement report from the UE and selecting a target cell from a list of candidate cells (2) serving cell sending a X2AP: HO request message to an appropriate target cell, (3) target cell responding to the serving cell with a X2AP: HO request Acknowledgement message, (4) serving cell sending an RRC connection reconfiguration message to the UE with partial system information regarding the target cell (upon the positive HO request Ack from the target cell), (5) UE performing RACH procedure and establishing RRC connection with the target cell and (6) the data path switching from the serving cell to the target cell.

Where a standard-compliant UE has additional capabilities/limitations which are non-compliant with standards or those capabilities/limitations are not covered in the standards yet, the UE capabilities/limitations are required to be informed to the target cell, if the target cell is also capable of supporting UEs with these additional capabilities/limitations. For example, the additional capability of a special UE may involve providing special content services to the users with better or specialized QoS. Such limitations may include half-duplex operation.

Figure 5:
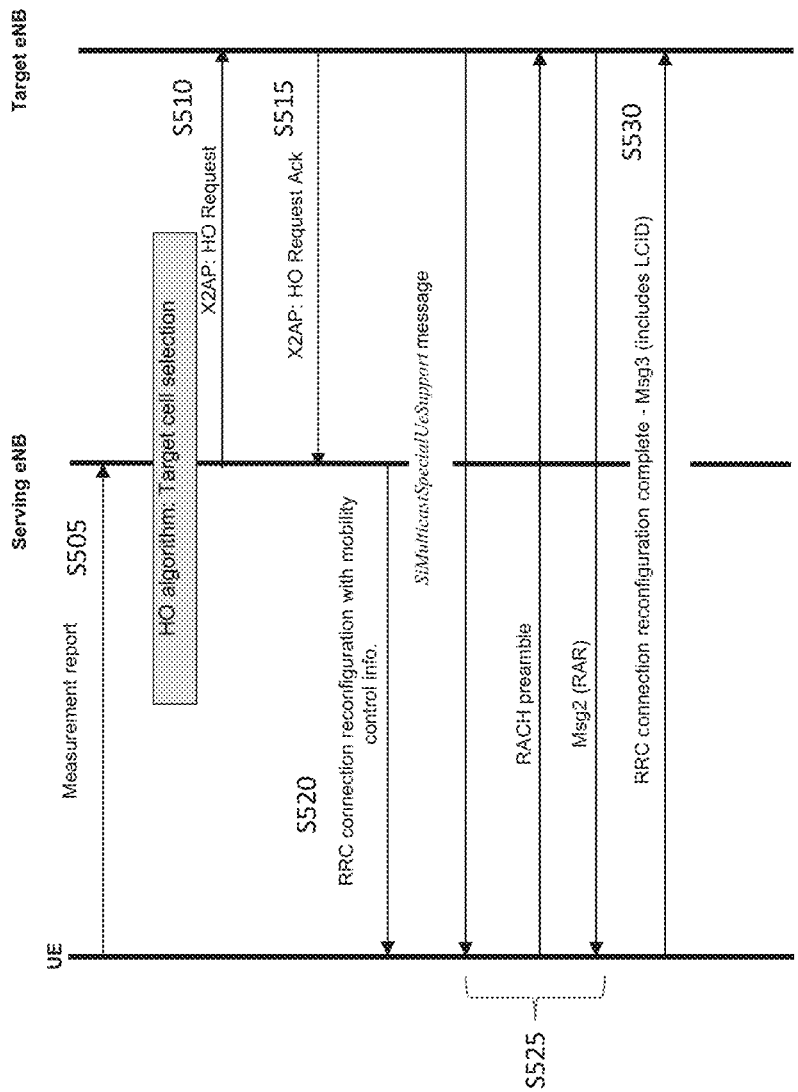
FIG. 5 is a signaling diagram illustrating a method for handover according to an embodiment of the disclosed subject matter.

FIG. 5 is a signaling diagram illustrating a method for handover according to an embodiment of the disclosed subject matter. In this embodiment, all eNBs share capabilities to support the special UEs with their neighbor eNBs. For example, this can be done via X2 SetupRequest/Response or enbConfigurationUpdate message.

Referring to FIG. 5, a serving cell receives a measurement report from the UE (S505). The serving cell may choose an appropriate target cell with the help of the measurement report. The serving cell's decision of the target cell may be based on the target cell's capability to support the special UE's requirements. For example, a target cell with the second highest RSRP/RSRQ measurement with the capability of supporting the special UE may be preferred than a target cell with the highest RSRP/RSRQ but without the capability of supporting the special UE. A set of target cells which can support the special UE capabilities and RSRP/RSRQ is above a predefined threshold are selected. Subsequently, a target cell with the highest RSRP/RSRQ among the set is selected as the target cell. The predefined threshold for RSRP/RSRQ is determined based on, for example, estimated SINR from the received RSRQ or received RSRP and an estimate of interference power over thermal noise power.

Thereafter, the serving cell sends X2AP:HO request to a selected target cell (S510). Then, the target cell responds with X2AP: HO request Acknowledgement (S515).

Subsequently, the Serving cell sends RRC connection reconfiguration message to the UE (S520). Then, the UE moves to the target cell and performs RACH procedure (S525). At this time the UE may not be aware of the capabilities of the target cell to support the special requirements. To ensure the capabilities of the target cell, the UE reads SiMuticast message transmitted by the target cell.

After successful RACH preamble transmission, UE sends the RRC connection reconfiguration complete message as part of Msg3 (S530). The UE includes an LCID in Msg3 to confirm it's special UE status, if the target cell is confirmed to support the special UE services.

Figure 6:
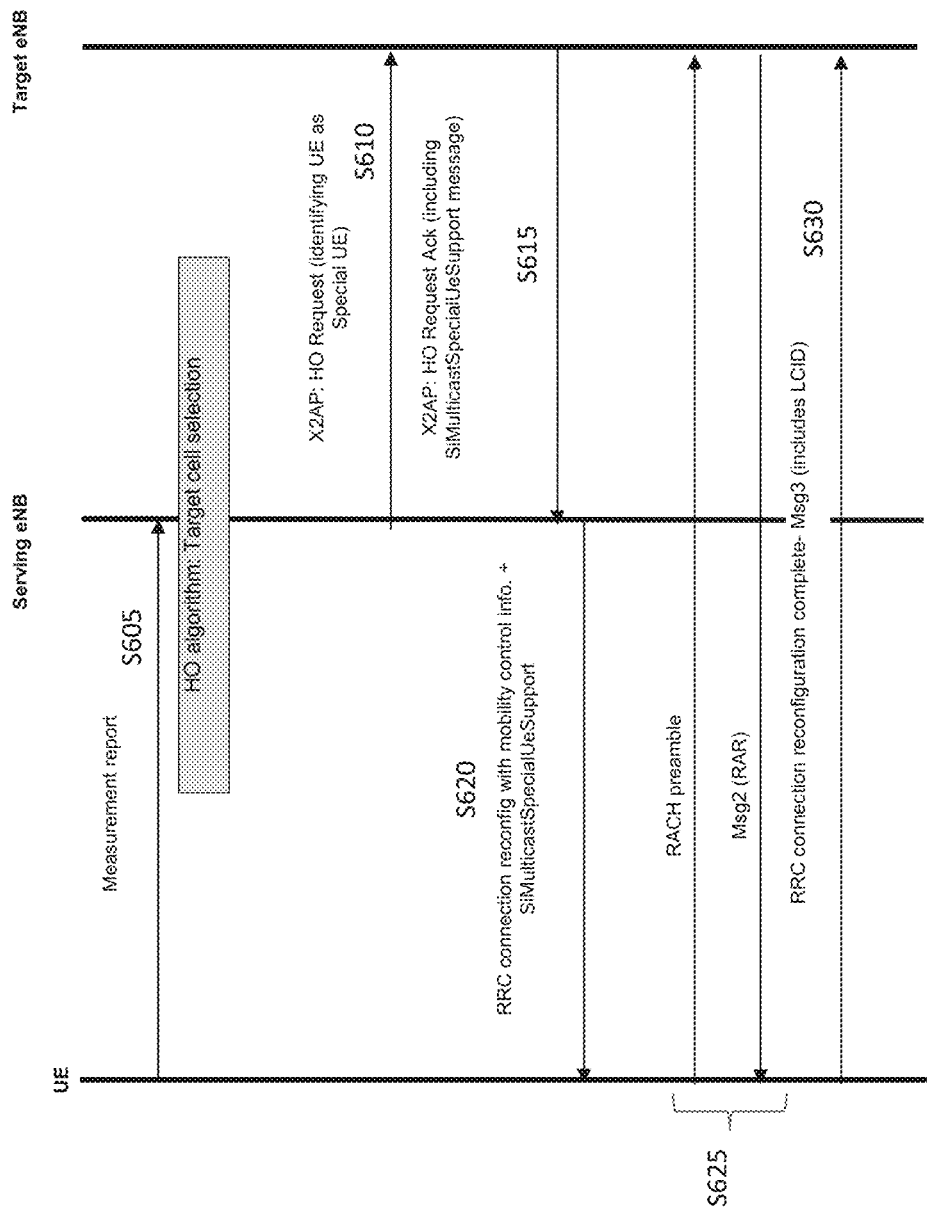
FIG. 6 is a signaling diagram illustrating a method for handover according to an embodiment of the disclosed subject matter.

FIG. 6 is a signaling diagram illustrating a method for handover according to an embodiment of the disclosed subject matter. In this embodiment, all eNBs share capability to support the special UEs with their neighbor eNBs. For example, this can be done via X2 SetupRequest/Response or enbConfiguationUpdate message.

Referring to FIG. 6, a serving cell receives the measurement report from the UE (S605). The serving cell may choose an appropriate target cell with the help of the measurement report. The serving cell's decision of the target cell may be based on the target cell's capability to support the special UE's requirements. For example, a target cell with the second highest RSRP/RSRQ measurement with the capability of supporting the special UE may be preferred than a target cell with the highest RSRP/RSRQ but without the capability of supporting the special UE. A set of target cells which can support the special UE capabilities and RSRP/RSRQ is above a predefined threshold are selected. Subsequently, a target cell with the highest RSRP/RSRQ among the set is selected as the target cell. The predefined threshold for RSRP/RSRQ is determined based on, for example, estimated SINR from the received RSRQ or received RSRP and an estimate of interference power over thermal noise power.

Thereafter, the serving cell sends X2AP:HO request to a selected target cell (S610). The serving cell identifies to the target cell that the incoming UE is a special UE.

The target cell responds with X2AP: HO request Acknowledgement (S615). The target cell includes SiMuticast message in mobility control information.

The serving cell sends RRC connection reconfiguration message to the UE (S620).

The UE moves to the target cell and performs RACH procedure (S625). At this time the UE is fully aware of the capabilities of the target cell to support the special requirements.

After successful RACH preamble transmission, UE sends the RRC connection reconfiguration complete message as part of Msg3 (S630). The UE may include an LCID in Msg3 to confirm it's a special UE status.

Figure 7:
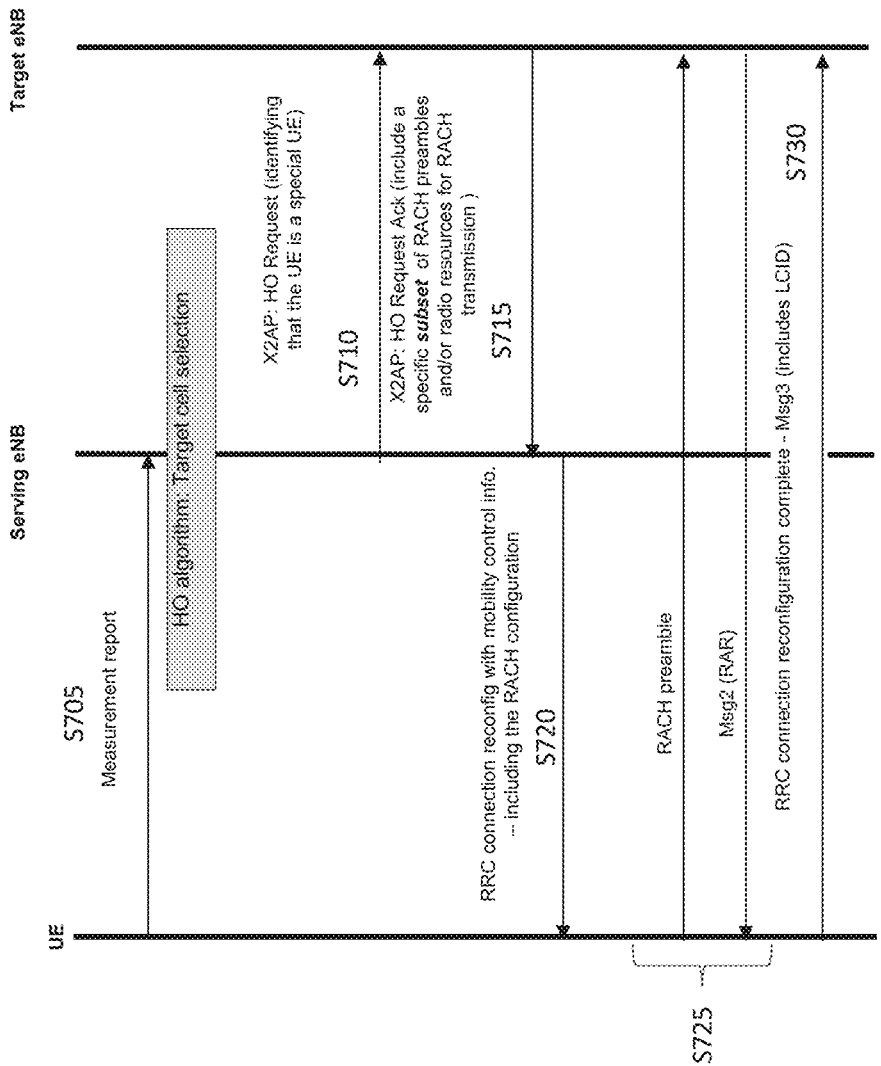
FIG. 7 is a signaling diagram illustrating a method for handover according to an embodiment of the disclosed subject matter.

FIG. 7 is a signaling diagram illustrating a method for handover according to an embodiment of the disclosed subject matter. In this embodiment, all eNBs are required to share capability to support the special UEs with their neighbor eNBs. For example, this can be done via X2 SetupRequest/Response or enbConfiguationUpdate message.

Referring to FIG. 7, the serving cell receives the measurement report from the UE (S705). The serving cell may choose an appropriate target cell with the help of the measurement report. The serving cell's decision of the target cell may be based on the target cell's capability to support the special UE's requirements. For example, a target cell with the second highest RSRP/RSRQ measurement with the capability of supporting the special UE may be preferred than a target cell with the highest RSRP/RSRQ but without the capability of supporting the special UE. A set of target cells which can support the special UE capabilities and RSRP/RSRQ is above a predefined threshold are selected. Subsequently, a target cell with the highest RSRP/RSRQ among the set is selected as the target cell. The predefined threshold for RSRP/RSRQ is determined based on, for example, estimated SINR from the received RSRQ or received RSRP and an estimate of interference power over thermal noise power Thereafter, the serving cell sends X2AP:HO request to a selected target cell (S710). The serving cell identifies to the target cell that the incoming UE is a special UE.

The target cell responds with X2AP: HO request Acknowledgement (S715). The target cell includes a unique set of RACH preambles and/or radio resource configuration for transmitting RACH preamble. The target also includes the SiMuticast message and serving cell sends out to the UE as part of the HO command.

The serving cell sends an RRC connection reconfiguration message to the UE including the unique set of the unique preambles and/or radio resource configuration for transmitting RACH preambles received from the target cell (S720). The UE moves to the target cell and performs RACH procedure by randomly selecting one of RACH preambles and/or radio resources for PRACH transmission (S725). At this time the UE is fully aware of the capabilities of the target cell to support the special requirements.

After successful RACH preamble transmission, UE sends the RRC connection reconfiguration complete message as part of Msg3 (S730). The UE may include an LCID in Msg3 to confirm it's a special UE status. This is an optional step. The network may have already identified the special UE as part of the previous step, when the UE sends RACH preamble from a set of dedicated preambles. However, if the network needs reliable confirmation of UE's status, this step can be additionally enabled.

In certain alternative embodiments, after receiving the neighbor cell measurements from the special UE, the serving cell may try to find a suitable neighbor cell for a potential HO. If the serving eNB finds neighbor cell which supports the special UEs, handover will be triggered. The serving cell's eNB will send an X2 or S1 HO request message to a selected target cell's eNB. In this message the serving cell identifies to the target cell that the incoming UE is a special UE. If the target cells's eNB is capable of supporting the special UEs and have enough radio resources to support the incoming special UE, responds to that identification message. Special UE need not perform any special task (i.e. no different from the UE behavior during the HO as defined in the current 3GPP standards).

On the other hand, if the target cell's eNB is not capable of supporting the special UEs, (or doesn't have sufficient radio resource to support) may not include a response to the identification message. If the serving cell receives HO request Ack from the target eNB without any response for the special UE identification message, HO is not triggered. It is the responsibility of the UE to search & re-establish the RRC connection with another suitable neighbor cell.

In certain other embodiments, the special UE only performs neighbor measurements with the neighbor cells which are capable of supporting them. This requires the special UE to detect and read the SiMulticast message multicast by the neighbor cells when performing neighbor cell measurements. The serving cell may provide, if required, gaps in the transmissions to facilitate these measurements.

FIGS. 8-11 are flowcharts illustrating methods according to various embodiments of the disclosed subject matter. In general, the described methods could be performed by any of various devices, systems, or apparatuses such as those illustrated in FIGS. 2A and 2B, for instance. Moreover, operations described in relation to FIGS. 8-11 could be performed by various types of modules, where a module is defined as any suitable combination of hardware and/or software capable of performing a designated function.

Figure 8:
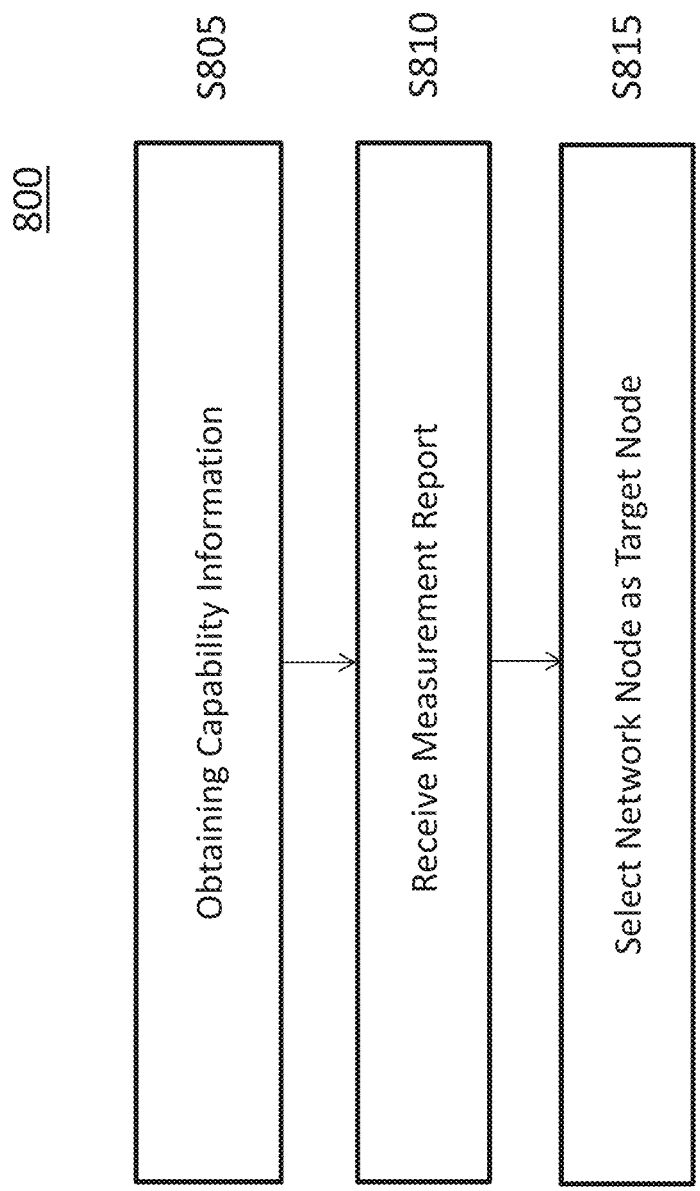
FIG. 8 is a flowchart illustrating a method of operating a network node according to an embodiment of the disclosed subject matter.

FIG. 8 is a flowchart illustrating a method of operating a network node according to an embodiment of the disclosed subject matter. The method of FIG. 8 could be performed by a network node such as the radio access nodes illustrated in FIGS. 2A and 2B, for instance.

Referring to FIG. 8, the method comprises obtaining capability information indicating whether neighbor network nodes support special UEs (S805), receiving a measurement report for the neighbor network nodes from a special UE (S810), and selecting one of the network nodes as a target node for handover of the special UE based on the received measurement report and the obtained capability information (S815).

In certain embodiments, the method further comprises sending a handover request message to the selected target node, the handover request message requesting handover for the special UE as an incoming UE and indicating that the incoming UE is a special UE. In some such embodiments, the method further comprises receiving a handover request acknowledgement message from the target node, the handover request acknowledgement message comprising mobility control information that includes a special multicast message. The special multicast message typically indicates that the target node supports special UEs, and the handover request acknowledgement message typically comprises a set of RACH preambles as part of the mobility control information.

In certain embodiments, the handover request acknowledgement message comprises a set of physical resources for transmission of RACH preamble as part of the mobility control information. In some such embodiments, the handover request acknowledgement message comprises a set of physical resources for transmission of RACH preamble as part of the mobility control information.

In certain embodiments, the method further comprises sending mobility control information received from the target node towards the special UE.

Figure 9:
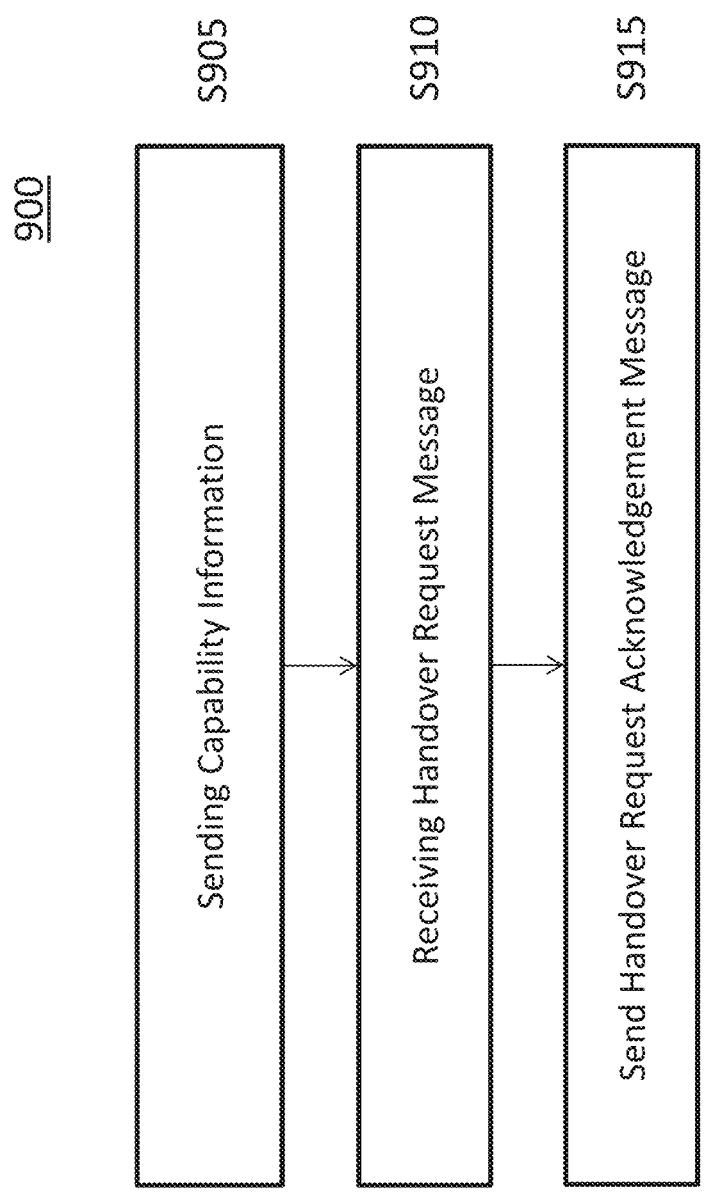
FIG. 9 is a flowchart illustrating a method of operating a network node according to an embodiment of the disclosed subject matter.

FIG. 9 is a flowchart illustrating a method of operating a network node according to an embodiment of the disclosed subject matter. The method of FIG. 9 could be performed by a network node such as the radio access nodes illustrated in FIGS. 2A and 2B, for instance.

Referring to FIG. 9, the method comprises sending capability information to neighbor network nodes, the capability information indicating whether neighbor network nodes support special UEs (S905), receiving a handover request message requesting handover of an incoming UE to the network node as a target node, the handover request message indicating that the incoming UE is a special UE (S910), and sending a handover request acknowledgement message from the target node, the handover request acknowledgement message comprising mobility control information that includes a special multicast message (S915).

In certain embodiments, the special multicast message indicates the support information from a network node for special UE.

In certain embodiments, the handover request acknowledgement message comprises a set of RACH preambles as part of the mobility control information.

In certain embodiments, the handover request acknowledgement message comprises a set of physical resources for transmission of RACH preamble as part of the mobility control information. In some such embodiments, the handover request acknowledgement message includes a set of physical resources for transmission of RACH preamble as part of the mobility control information.

In certain embodiments, the handover request acknowledgement message from the target node includes a set of RACH preambles as part of the mobility control information.

In certain embodiments, the method further comprises receiving an LCID from the special UE as part of message 3.

In certain embodiments, the method further comprises receiving one from the set of RACH preambles included in the mobility control information from the UE.

In certain embodiments, the method comprises receiving a RACH preamble in one of the set of RACH preamble physical resources included in the mobility control information from the UE.

In certain embodiments, the method further comprises receiving a RACH preamble from the set of RACH preambles included in the mobility control information in one of the set of RACH preamble physical resources included in the mobility control information from the UE.

Figure 10:
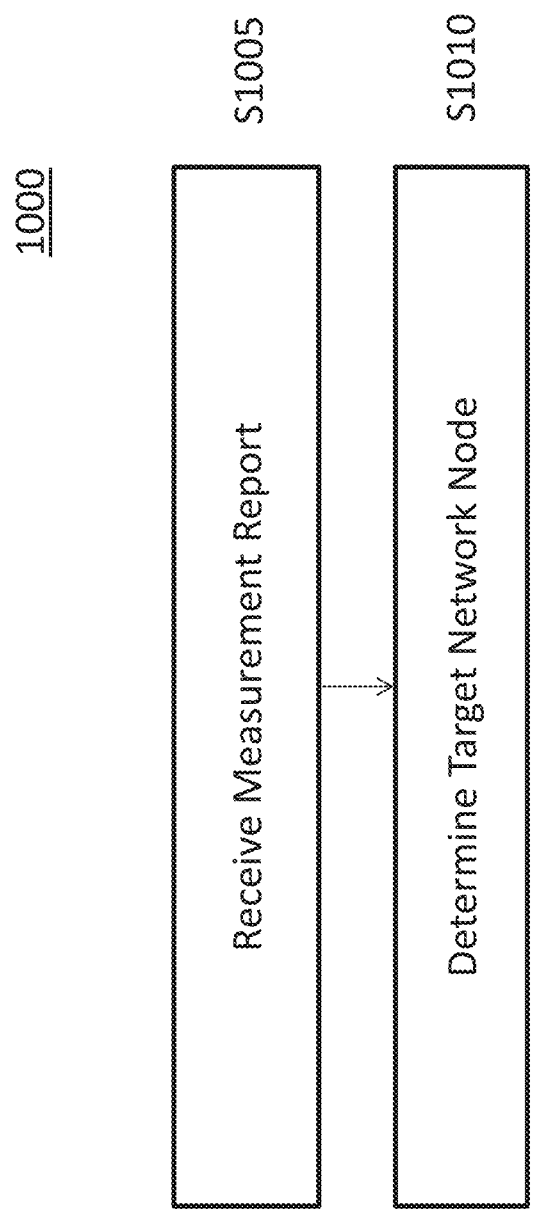
FIG. 10 is a flowchart illustrating a method of operating a communication system according to an embodiment of the disclosed subject matter.

FIG. 10 is a flowchart illustrating a method of operating a communication system according to an embodiment of the disclosed subject matter. The method is typically performed by for a handover procedure by a communication system comprising a UE, a serving network node and at least two additional network nodes, wherein the at least two network nodes shared information about their respective capabilities with their respective at least one neighbor network node. The method of FIG. 10 could be performed by a communication system such as those illustrated in FIGS. 2A and 2B, for instance.

Referring to FIG. 10, the method comprises, at the serving network node receiving a measurement report from the UE, wherein the measurement report comprises information about non-standard complaint capabilities of the UE (S1005), and at the serving network node determining based on the measurement report a target network node among the at least two additional network nodes (S1010).

In certain embodiments, the method further comprises the target network node broadcasting the target network node's non-standard compliant capabilities to the at least one UE. In some such embodiments, the broadcasting comprises transmitting a SiMulticastSpecialUeSupport message.

In certain embodiments, the method further comprises after RACH preamble transmission, the UE sending to the target network node an RRC connection reconfiguration complete as part of Random Access Msg 3, wherein the Msg 3 comprises a LCID indicating that the UE comprises non-standard complaint capabilities.

In certain embodiments, the method further comprises the serving network node sending, as part of the hand-over request, to the target network node information identifying the UE as a UE comprising non-standard complaint capabilities.

In certain embodiments, the method further comprises the target network node sending, as part of the hand-over request acknowledgement, a SiMulticastSpecialUeSupport message, to the serving network node, wherein the SiMulticastSpecialUeSupport message comprise information about the target network nodes capabilities to support UE comprising non-standard complaint capabilities, and the serving network node sending an RRC connection reconfiguration message to the UE, the RRC connection reconfiguration message comprising the SiMulticastSpecialUeSupport message information.

In certain embodiments, the method further comprises, after RACH preamble transmission, the UE sending to the target network node an RRC connection reconfiguration complete as part of Random Access Msg 3, wherein the Msg 3 comprises a Logical Channel Identity, LCID, indicating that the UE comprise non-standard complaint capabilities.

In certain embodiments, the method further comprises the serving network node sending, as part of the hand-over request, to the target network node information identifying the UE as a UE comprising non-standard complaint capabilities. In some such embodiments, the method further comprises the target network node sending, as part of the hand-over request acknowledgement, a unique set of RACH preambles and/or radio resource configuration for sending RACH preambles and a SiMulticastSpecialUeSupport message, to the serving network node, and the serving network node sending a unique set of RACH preambles and/or radio resource configuration for sending RACH preambles to the UE. In some such embodiments, the method further comprises the UE performing the RACH procedure, wherein the RACH procedure comprises randomly selecting one RACH preamble and/or radio resource configuration for sending the RACH preamble. In some such embodiments, the method further comprises, after RACH preamble transmission, the UE sending to the target network node, a RRC connection reconfiguration complete as part of Random Access Msg 3, wherein the Msg 3 comprises an LCID indicating that the UE comprise non-standard complaint capabilities.

Figure 11:
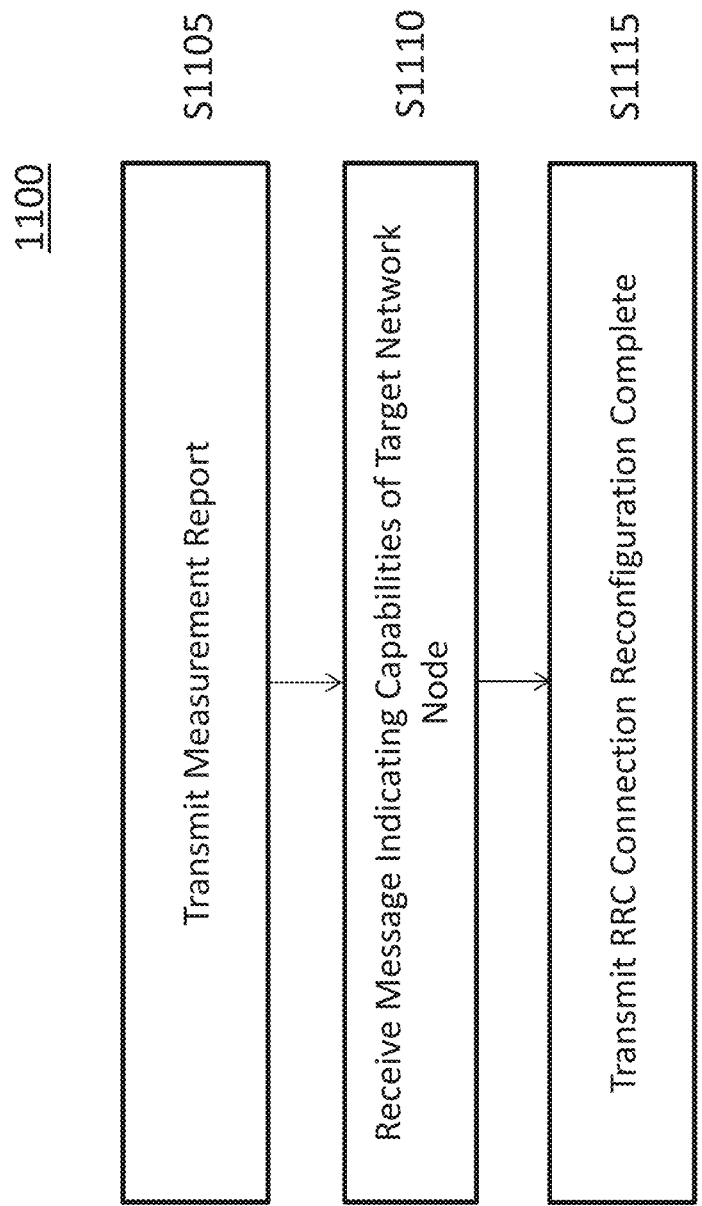
FIG. 11 is a flowchart illustrating a method of operating a wireless communication device according to an embodiment of the disclosed subject matter.

FIG. 11 is a flowchart illustrating a method of operating a wireless communication device according to an embodiment of the disclosed subject matter. The method of FIG. 11 could be performed by a wireless communication device such as those illustrated in FIGS. 2A and 2B, for instance.

Referring to FIG. 11, the method comprises transmitting a measurement report to a serving network node, the measurement report comprising information about non-standard complaint capabilities of the wireless communication device (S1105), receiving from the serving network node a message indicating capabilities of a target network node to support a wireless communication device having the non-standard complaint capabilities, wherein the message is obtained by the serving node from the target network node, and after RACH preamble transmission (S1110), and transmitting to the target network node a RRC connection reconfiguration complete as part of Random Access Msg 3, wherein the Msg 3 comprises an LCID indicating that the wireless communication device has the non-standard complaint capabilities (S1115).

In certain embodiments, the method further comprises receiving information broadcasted from the target network node and indicating non-standard compliant capabilities of the target network node. In some such embodiments, the broadcasted information comprises a SiMulticastSpecialUeSupport message.

In certain embodiments, the method further comprises receiving a set of RACH preambles and/or radio resource configuration from the serving network node, and performing a RACH procedure, comprising randomly selecting a RACH preamble and/or radio resource configuration from among the received set, wherein the set is received by the serving network node from the target network node as part of a handover request acknowledgement.

In the above-description, it is to be understood that the terminology used herein is for the purpose of describing particular embodiments only and is not intended to be limiting of the disclosed subject matter in general. Unless otherwise defined, all terms (including technical and scientific terms) used herein have the same meaning as commonly understood by those of ordinary skill in the art. Terms such as those defined in commonly used dictionaries should be interpreted as having a meaning consistent with their meaning in the context of this specification and the relevant art and will not be interpreted in an idealized or overly formal sense unless expressly indicated to the contrary.

Where a feature is described as being "connected", "responsive", or variants thereof to another feature, it can be directly connected or responsive to the other element or intervening elements may be present. Furthermore, "coupled", "connected", "responsive", or variants thereof as used herein may include wirelessly connected or responsive. As used herein, the singular forms "a", "an" and "the" are intended to include the plural forms as well, unless the context clearly indicates otherwise. Well-known functions or constructions may not be described in detail for the sake of brevity and/or clarity. The term "and/or" includes any and all combinations of one or more of the associated listed items.

Although the terms first, second, third, etc. may be used herein to describe various features, these features should not be limited by these terms. Rather, these terms are used merely to distinguish one feature from another. Thus a first feature could alternatively be termed a second feature and vice-versa without departing from the presented teachings.

As used herein, terms such as "comprise", "comprising", "comprises", "include", "including", "includes", "have", "has", "having", etc., are open-ended and indicate the presence of one or more stated features but do not preclude the presence or addition of other features.

Certain embodiments are described herein with reference to block diagrams and/or flowchart illustrations of computer-implemented methods, apparatus (systems and/or devices) and/or computer program products. A block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, certain embodiments may be implemented in hardware and/or in software (including firmware, resident software, micro-code, etc.) that runs on a processor such as a digital signal processor, which may collectively be referred to as "circuitry," "a module" or variants thereof.

In some alternate implementations, functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of the disclosed subject matter. Moreover, although some of the diagrams include arrows on communication paths to show a primary direction of communication, it is to be understood that communication may occur in the opposite direction to the depicted arrows.

While the disclosed subject matter has been presented above with reference to various embodiments, it will be understood that various changes in form and details may be made to the described embodiments without departing from the overall scope of the disclosed subject matter.

The invention claimed is:

1. A method of operating a wireless communication device, comprising:
   transmitting a measurement report to a serving network node, the measurement report comprising information about non-standard-compliant capabilities of the wireless communication device;
   receiving from the serving network node a message indicating capabilities of a target network node to support a wireless communication device having the non-standard-compliant capabilities, wherein the message is obtained by the serving node from the target network node; and
   after Random Access Channel (RACH) preamble transmission, transmitting to the target network node a Radio Resource Control (RRC) connection reconfiguration complete as part of Random Access Msg 3, wherein the Msg 3 comprises a Logical Channel Identity (LCID) indicating that the wireless communication device has the non-standard-compliant capabilities.

2. The method of claim 1, further comprising receiving information broadcasted from the target network node and indicating non-standard compliant capabilities of the target network node.

3. The method of claim 2, wherein the broadcasted information comprises a SiMulticastSpecialUeSupport message.

4. The method of claim 1, further comprising:
   receiving a set of RACH preambles and/or radio resource configuration from the serving network node; and
   performing a RACH procedure, comprising randomly selecting a RACH preamble and/or radio resource configuration from among the received set, wherein the set is received by the serving network node from the target network node as part of a handover request acknowledgement.

5. A wireless communication device, comprising:
   processing circuitry, memory and transceiver circuitry collectively configured to:
   transmit a measurement report to a serving network node, the measurement report comprising information about non-standard-compliant capabilities of the wireless communication device;
   receive from the serving network node a message indicating capabilities of a target network node to support a wireless communication device having the non-standard-compliant capabilities, wherein the message is obtained by the serving node from the target network node; and
   after Random Access Channel (RACH) preamble transmission, transmit to the target network node a Radio Resource Control (RRC) connection reconfiguration complete as part of Random Access Msg 3, wherein the Msg 3 comprises a Logical Channel Identity (LCID) indicating that the wireless communication device has the non-standard-compliant capabilities.

6. The wireless communication device of claim 5, wherein the processing circuitry, memory and transceiver circuitry are further collectively configured to receive information broadcasted from the target network node and indicating non-standard compliant capabilities of the target network node.

7. The wireless communication device of claim 6, wherein the broadcasted information comprises a SiMulticastSpecialUeSupport message.

8. The wireless communication device of claim 5, wherein the processing circuitry, memory and transceiver circuitry are further collectively configured to receive a set of RACH preambles and/or radio resource configuration from the serving network node; and
   perform a RACH procedure, comprising randomly selecting a RACH preamble and/or radio resource configuration from among the received set, wherein the set is received by the serving network node from the target network node as part of a handover request acknowledgement.

* * * * *